United States Patent [19]

Weaver et al.

[11] Patent Number: 4,850,774
[45] Date of Patent: Jul. 25, 1989

[54] SELF-LOCKING ADJUSTABLE SCREW

[75] Inventors: Gene R. Weaver, Mulvane; Joe E. Sternberger, Wichita, both of Kans.

[73] Assignee: The Boeing Company, Seattle, Wash.

[21] Appl. No.: 113,611

[22] Filed: Oct. 26, 1987

[51] Int. Cl.$^4$ .......................... F16B 39/22; F16B 21/00
[52] U.S. Cl. .................................... 411/298; 411/348; 24/453
[58] Field of Search ............... 411/21, 296–298, 411/348, 351, 941.3; 24/453

[56] References Cited

U.S. PATENT DOCUMENTS

| | | | |
|---|---|---|---|
| 4,016,914 | 4/1977 | Zurko | 411/348 |
| 4,507,034 | 3/1985 | Lew et al. | 411/348 |
| 4,655,657 | 4/1987 | Duran | 411/348 |
| 4,681,495 | 7/1987 | Crespin et al. | 411/298 |

*Primary Examiner*—Neill R. Wilson
*Attorney, Agent, or Firm*—Finnegan, Henderson, Farabow, Garrett & Dunner

[57] ABSTRACT

A self-locking adjustable screw comprising a housing having a generally tubular axial bore extending between openings in the axial opposed first and second ends thereof, a generally tubular downlock element coaxially disposed in the axial bore, the element including a co-axial bore extending between a closed end and an opening in a driving end, screw threads operatively interconnecting the element with the wall of the axial bore for translating rotation of the element into axial movement, a lock pin disposed for axial movement in the co-axial bore, a spring disposed between the closed end of the co-axial bore and the lock pin for biasing the lock pin toward the opening of the co-axial bore, a pin in slot structure for limiting the axial movement of the lock pin, a lock member movably disposed in a radially extending bore interconnecting the co-axial bore with the axial bore such that the lock in its normal position places the lock member in engagement with axial grooves in the wall of the axial bore to prevent rotation of the element, a reduced diameter portion in the lock pin for receiving the inward end of the lock and releasing the element for rotation to axially adjust its position when the lock pin is moved against the bias of the spring by insertion of a wrenching tool in the open end of the co-axial bore.

5 Claims, 4 Drawing Sheets

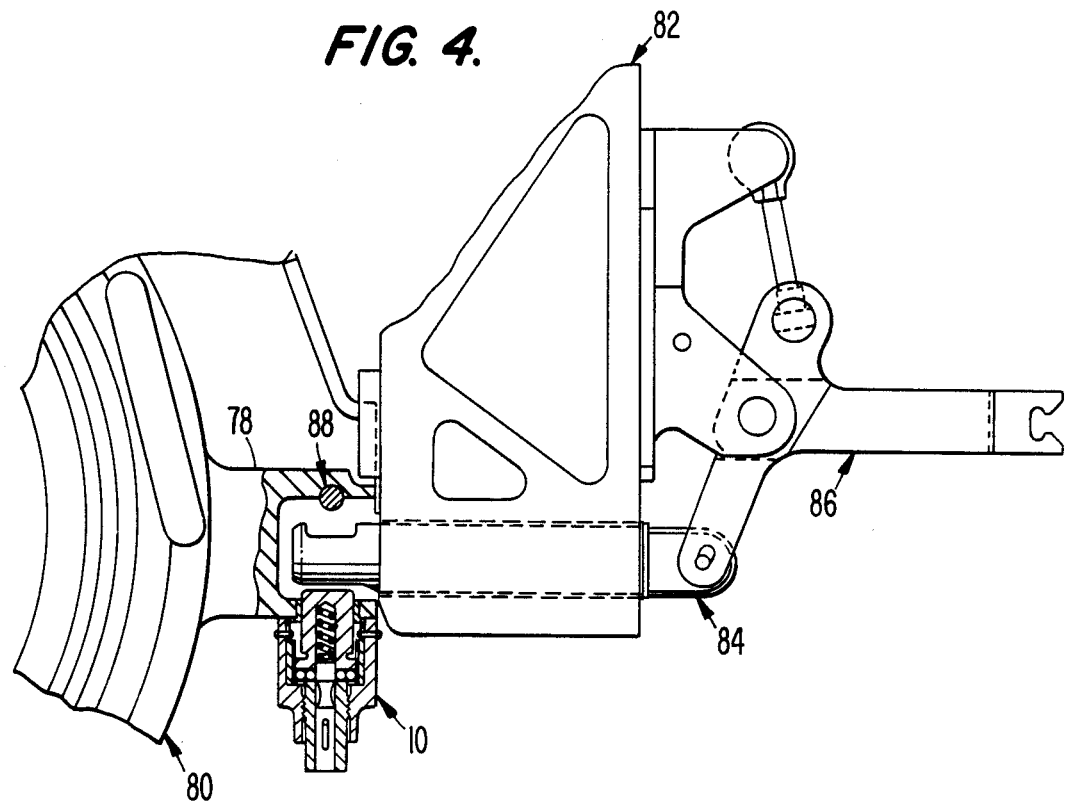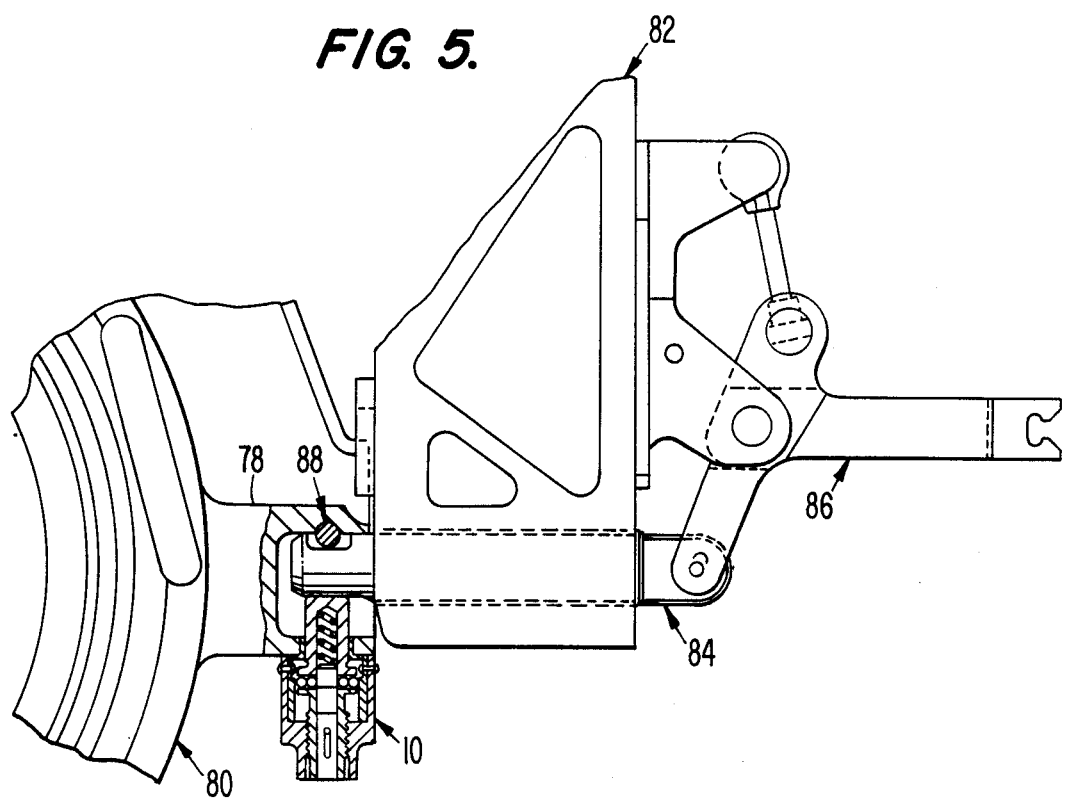

4,850,774

SELF-LOCKING ADJUSTABLE SCREW

The U.S. government has a paid-up license in this invention and the right in limited circumstances to require the patent owner to license others on reasonable terms as provided for by the terms of Contract No. F33657-85-C-2097 awarded by the Department of Defense.

BACKGROUND OF THE INVENTION

1. Field of the Invention

The present invention relates to a self locking adjustable screw, and in particular, to a screw which may be axially adjusted by screw action imposed through a wrench and which automatically unlocks with application of the wrench and locks on the removal of the wrench.

2. Description of Related Art

The subject invention relates to retaining screws and the like which may be tightened or loosened, and which require means for locking the screw in the desired position. Adjustable retaining screws or bolts are used in a variety of locations and the locking feature is necessary in environments where vibration may inadvertently loosen the screw or bolt. When such screws are used in an aircraft, they are frequently secured in the desired position by use of cotter keys or wires which pass through a bore in the bolt and are secured to a surrounding structure. The disadvantage of such securing mechanisms is the difficulty in adjusting or releasing the screw or bolt since the cotter key or wire must be removed prior to adjustment and replaced after the bolt is adjusted to the desired position.

The necessity for an automatically self-locking retaining screw or bolt is particular evident where the screw or bolt is used to hold heavy objects in position. For example, loading a weapon delivery system into the weapons bay of an aircraft requires placing the large, unweildy, heavy weapons delivery system in position while securing one or more downlock screws on the launcher end fittings to projections in the weapons bay. Securing the downlock screw in position after the weapon system is loaded in the bay is time consuming, could be dangerous, and is very difficult in view of the cramped space, particularly when a wire or other securing method is needed to lock the downlock screw in place.

Subject invention provides a self-locking adjustable screw which is easily adjusted to a desired position and automatically locks in that position after removal of the tool used to adjust the screw.

SUMMARY OF THE INVENTION

The object and advantages of the invention may be realized and obtained by the instrumentalities and combinations particularly pointed out in the appended claims.

In accordance with the invention, as embodied and broadly described herein, a self-locking adjustable screw comprises a housing having a generally tubular axial bore extending between openings in axially opposed first and second ends thereof, the housing including an annular step in the bore defining a first bore portion between the step and the first end and a second bore portion between the step and the second end, the diameter of the first bore portion being greater than the diameter of the second bore portion; a generally tubular downlock element co-axially disposed in the axial bore, the element having an engaging end extending through the opening in the first end and a driving end extending to proximate the opening in the second end, the element including a co-axial bore extending between a closed end proximate the engaging end and an opening in the driving end; thread means operatively interconnecting the element and the wall of the second bore portion for translating rotation of the element into axial movement thereof; a lock pin disposed for axial movement in the co-axial bore; means for biasing the lock pin toward the opening of the co-axial bore; means for limiting the axial movement of the lock pin; means for interconnecting the element with the wall of the first bore portion for preventing rotation of the element; and means responsive to movement of the lock pin against the biasing means for releasing the preventing means to permit rotation of the element.

Preferably the interconnecting means comprises a lock member slidably disposed in a radial slot communicating between the co-axial bore of the first bore portion and means on the wall of the first bore portion for engaging the lock member to prevent rotation of the element, the lock pin normally engaging the radially inward end of the lock member to project the radially outward end thereof from the radial slot into engagement with the engaging means.

It is preferred that the releasing means comprise an annular reduced diameter portion in the lock pin disposed to receive the radially inward end of the lock member on selective axial movement of the lock pin against the biasing means.

The lock pin of the invention preferably includes means in the opening of the engaging end for drivingly receiving a wrenching tool, and wherein the lock pin is normally disposed to be axially moved against the biasing means by the wrenching tool to release the interconnecting means and permit axial movement of the element by rotation thereof.

BRIEF DESCRIPTION OF THE DRAWINGS

The accompanying drawings, which are incorporated in and constitute a part of this specification, illustrate one embodiment of the invention, and together with the description, serve to explain the principles of the invention.

FIG. 4 is a cross-sectional side view of the embodiment of FIG. 1 in the released, locked position.

FIG. 5 is a cross-sectional side view of the embodiment of FIG. 1 in the secured, locked position.

DETAILED DESCRIPTION OF THE PREFERRED EMBODIMENT

Reference will now be made in detailed to the present preferred embodiments of the invention, examples of which are illustrated in the accompanying drawings.

The self-locking adjustable screw of the invention comprises a housing having a generally tubular axial bore extending between openings in axially opposed first and second ends thereof, the housing including an annular step in the bore defining a first bore portion between the step and the first end and a second bore portion between the step and the second end, the diameter of the first bore portion being greater than the diameter of the second bore portion.

Figure 1:
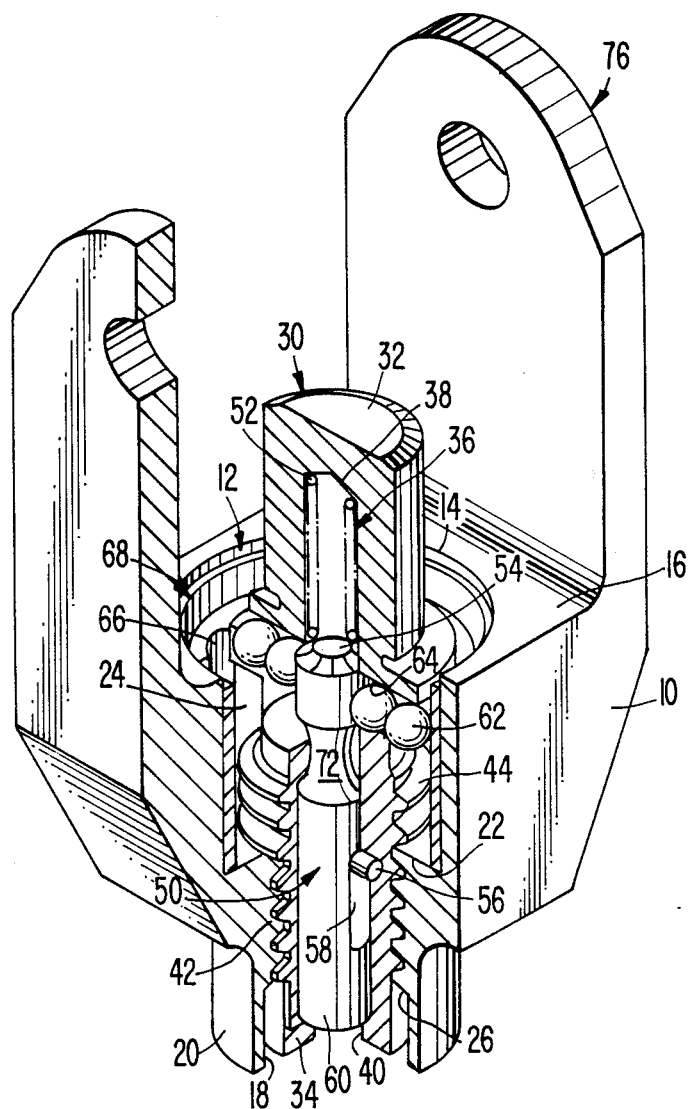
FIG. 1 is a partially cut away perspective of an embodiment of the invention.
Figure 2:
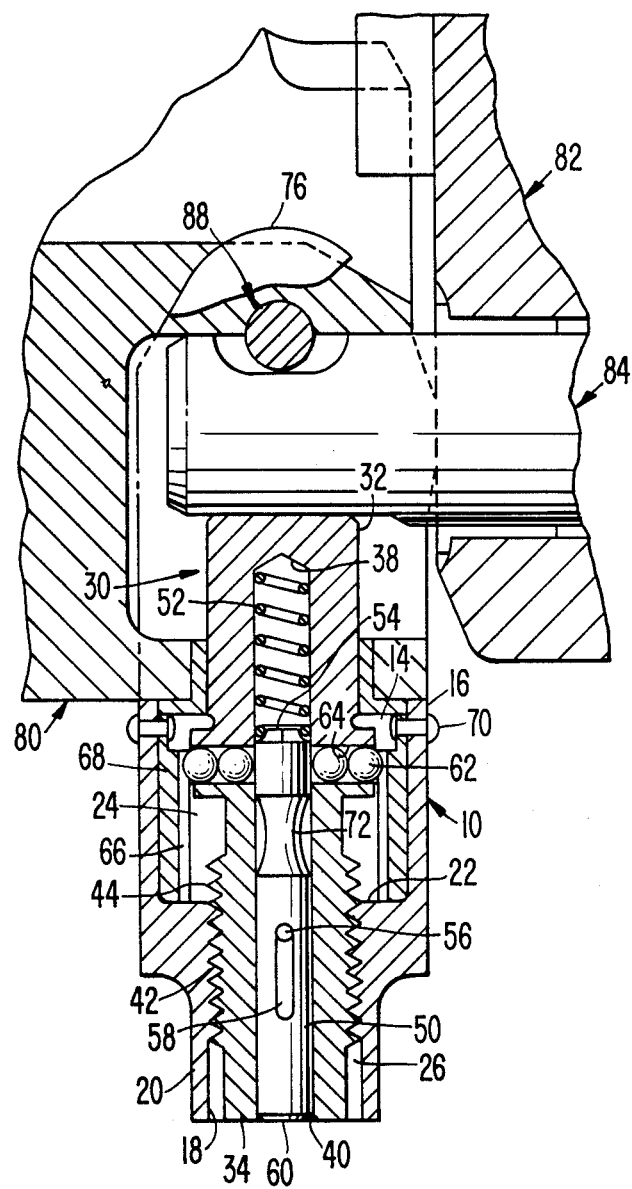
FIG. 2 is a cross-sectional view of the embodiment of the invention of FIG. 1 in the locked position.
Figure 3:
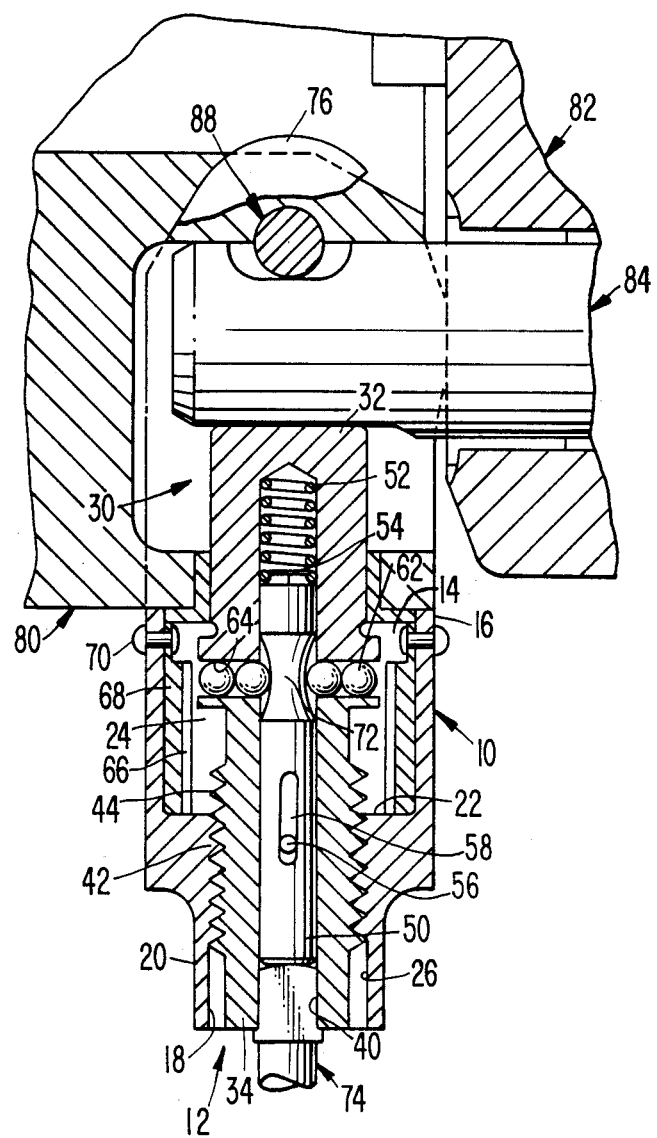
FIG. 3 is a cross-sectional view of the embodiment of FIG. 1 in the unlocked position.

As embodied and depicted in FIGS. 1, 2, and 3, housing 10 has a generally tubular axial bore 12 extending between opening 14 in first end 16 and opening 18 in the second end 20. Housing 10 includes annular step 22 projecting into bore 12 to define a first bore portion 24 between step 22 and first end 16 and a second bore portion 26 between step 22 and second end 20. The diameter of first bore portion 24 is greater than the diameter of second bore portion 26.

In accordance with the invention, the adjustable screw includes a generally tubular downlock element co-axially disposed in the axial bore, the element having an engaging end extending through the opening in the first end and a driving end extending to proximate the opening in the second end, the element including a co-axial bore extending between a closed end proximate the engaging end and an opening in the driving end.

As herein embodied and depicted in FIGS. 1, 2 and 3, generally tubular downlock element 30 is co-axially disposed in axial bore 12. Element 30 has an engaging end 32 extending through opening 14 in first end 16 and a driving end 34 extending to proximate opening 18 in second end 20. Element 30 includes co-axial bore 36 extending between a closed end 38 proximate engaging end 32 and opening 40 in driving end 34.

The invention further comprises thread means operatively interconnecting the element and the wall of the second bore portion for translating rotation of the element into axial movement thereof. As depicted in FIGS. 1, 2 and 3, the wall of second bore portion 26 includes female threads 42 disposed to threadably engage male threads 44 on the exterior surface of element 30. Rotation of element 30 effects axial movement thereof through the action of cooperating threads 42 and 44.

In accordance with the invention, the adjustable screw comprises a lock pin disposed for axial movement in the co-axial bore, means for biasing the lock pin toward the opening of the co-axial bore, and means for limiting the axial movement of the lock pin.

In the preferred embodiment depicted in FIGS. 1–3, lock pin 50 is disposed for slidable axial movement in co-axial bore 36 in element 30. Spring 52 disposed between closed end 38 of co-axial bore 36 and end 54 of pin 50 biases lock pin 50 toward opening 40 in driving end 34 of element 30. Axial movement of lock pin 50 is limited by finger 56 extending across axial bore 36 and being slidably received in axial slot 58 in lock pin 50. The length of slot 58 limits the axial travel of pin 50. The lower limit of axial travel of pin 50 effected by the bias of spring 52 places the other end 60 of pin 50 proximate opening 40 in driving end 34 of element 30.

In accordance with the invention, the self-locking adjustable screw comprises means interconnecting the element with the wall of the first bore portion for preventing rotation of the element.

In the preferred embodiment depicted in FIGS. 1–3, lock member 62 is movably disposed in radial slot 64 communicating between co-axial bore 36 and first bore portion 24. In the preferred embodiment, lock member 62 comprises a plurality of balls, although a machined pin may be used in the alternative. Means are provided on the wall of first bore portion 24 for engaging lock member 62 to prevent rotation of element 30. The engaging means comprises a plurality of circumferentially adjacent, axially extending grooves 66 on the wall of first bore portion 24, each groove 66 being disposed to receive the radially outward end of lock member 62.

In the preferred embodiment depicted in FIGS. 1–3, the engaging means comprises a cylindrical insert 68 fixed to the wall of first bore portion 24 and having the circumferentially adjacent, axially extending grooves 66 disposed to receive the radially outward end of lock member 62. As seen in FIG. 2, insert 68 is fixed by means of rivet 70 to the wall of housing 10.

In the normally biased position, lock pin 50 is so disposed in co-axial bore 36 as to abut against the radially inward end of lock member 62 to project the radially outward end of lock member 62 from radial slot 64 into engagement with axial groove 66. In this position, as seen in FIG. 2, rotation of element 30 about its axis is prevented by engagement of the balls comprising lock member 62 with axial groove 66. Since axial movement of member 30 is restricted by the cooperating threads 42 and 44, engaging end 32 of element 30 is prevented from moving from the selected position while balls comprising lock member 62 are projecting from radial slot 64.

In accordance with the invention, the adjustable screw further comprises means responsive to movement of the lock pin against the biasing means for releasing the preventing means to allow rotation of the element. In the embodiment of FIGS. 1–3, the releasing means comprises annular reduced diameter portion 72 in lock pin 50 which is disposed to receive the radially inward end of lock member 62 in response to axial movement of lock pin 50 against the bias of spring 52.

Figure 3A:
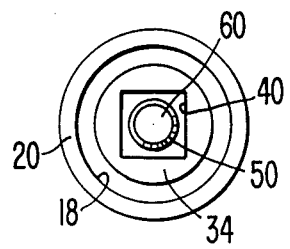
FIG. 3A is an end view of the embodiment of FIG. 2.

Preferably the adjustable screw of the invention also includes means in the opening of the driving end for drivingly receiving a wrenching tool. As seen in FIGS. 3 and 3a, the opening 40 in driving end 34 of element 30 is so shaped as to drivingly receive wrenching tool 74. As seen in FIG. 2, lock pin 50 is normally biased toward driving end 34 of element 30 such that insertion of wrenching tool 74 into opening 40 engages end 60 of lock pin 50 and moves it against the bias of spring 52 to dispose annular reduced diameter portion 72 to a position to receive the radially inward end of lock member 62 thereby releasing element 30 for rotation by means of wrenching tool 74. Rotation of the wrenching tool axially moves element 30 through the action of cooperating screw threads 42 and 44.

In operation, self locking adjustable screw 10 is affixed by means of fittings 76 (FIG. 1) to end fitting 78 of launcher 80 as seen in FIGS. 4 and 5. To load launcher 80 into the bay of an aircraft, it is necessary to secure it to support structure 82 which is accomplished by retracting load carrying pin 84 using mechanism 86. Element 30 of adjustable screw 10 is retracted as seen in FIG. 4 using wrench 74. When launcher 80 is in position, load carrying pin 84 is extended into the cavity in end fitting 78 of launcher 80. Wrench 74 is then used to axially move element 30 to secure end fitting 78 and interlock 88 to the projecting end of load carrying pin 84 as seen in FIG. 5. Because of the unique characteristics of the invention, removal of wrench 74 from opening 40 releases lock pin 50 thereby automatically locking element 30 in the engaged position depicted in FIG. 5.

It will be apparent to those skilled in the art that various modifications and variations may be made to the self-locking adjustable screw of the invention without departing from the scope or spirit of the invention.

What is claimed is:

1. A self-locking adjustable screw assembly comprising:
   a housing having a base and an axially opposed attachment end adapted for attachment to a structure axially spaced from said base, said base having a generally tubular axial bore extending between openings in axially opposed first and second ends thereof, said second end being remote from said attachment end, said base including an annular step in said bore defining a first bore portion having a generally annular wall extending between said step and said first end and a second bore portion having a screw-threaded annular wall extending from said step to proximate said second end, the diameter of said first bore portion being greater than the diameter of said second bore portion;
   a generally tubular downlock element co-axially disposed in said axial bore, said element having an engaging end extending through the opening in said first end toward said attachment end and a driving end extending to proximate the opening in said second end and adapted for engagement by a driving tool, said element including external screw threads proximate said driving end for cooperation with the screw-threaded wall of said second bore portion and said element having a co-axial bore extending between a closed end proximate the engaging end and an opening in said driving end; and
   means for selectively preventing rotation of said element in a plurality of axial positions relative to said attachment end, said preventing means including;
   a plurality of axially-extending, circumferentially-adjacent grooves around the wall of said first bore portion;
   a lock member disposed in a radial slot in said element communicating between said co-axial bore and said first bore portion, said lock member being movable between a lock position in engagement with one said groove and an unlock position;
   pin means slidably disposed in said co-axial bore for holding said lock member in said lock position and for selectively releasing said lock member for movement to said unlock position;
   means for biasing said pin means to an axial position normally holding said lock member in said lock position; and
   means responsive to engagement of said driving end by a tool for moving said pin means against said biasing means to release said lock member to said unlock position to permit rotation of said element to a selected axial position through co-operation of said screw threads.

2. The screw of claim 1, wherein said axially-extending, circumferentially-adjacent grooves are disposed on the inside surface of a cylindrically-shaped insert fixed to the wall of said first bore portion.

3. The screw of claim 1, wherein said lock member is a locking ball, dimensioned and configured to fit in the radial slot when in said unlock position, and to extend into one of the plurality of axial grooves when moved outward in the radial slot in said lock position.

4. The screw of claim 3, wherein said radial slot extends in radially opposite directions from said co-axial bore, and wherein a locking ball is disposed in said slot on each side of said co-axial bore.

5. The screw of claim 1, wherein said pin means comprises a lock pin including a large diameter portion engaging a radially inward end of said lock member to project the radially outward end thereof into engagement with one said groove, and an annular reduced diameter portion disposed to receive the radially inward end of said lock member when moved axially into said unlock position by engagement of said tool at the driving end.

* * * * *

UNITED STATES PATENT AND TRADEMARK OFFICE
CERTIFICATE OF CORRECTION

PATENT NO. : 4,850,774

DATED : July 25, 1989

INVENTOR(S) : GENE R. WEAVER and JOE E. STERNBERGER

It is certified that error appears in the above-identified patent and that said Letters Patent is hereby corrected as shown below:

IN THE SPECIFICATION:

Column 1, line 36, change "particular" to --particularly--;

Column 2, line 61, change "detailed" to --detail.

Signed and Sealed this

Fifteenth Day of May, 1990

Attest:

HARRY F. MANBECK, JR.

Attesting Officer

Commissioner of Patents and Trademarks